US010488652B2

(12) United States Patent
Shpunt et al.

(10) Patent No.: US 10,488,652 B2
(45) Date of Patent: Nov. 26, 2019

(54) PRISM-BASED SCANNER

(71) Applicant: APPLE INC., Cupertino, CA (US)

(72) Inventors: Alexander Shpunt, Portola Valley, CA (US); Niv Gilboa, Raanana (IL); Robert Upton, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 392 days.

(21) Appl. No.: 15/586,305

(22) Filed: May 4, 2017

(65) Prior Publication Data

US 2018/0081168 A1   Mar. 22, 2018

Related U.S. Application Data

(60) Provisional application No. 62/397,399, filed on Sep. 21, 2016.

(51) Int. Cl.
*G02B 26/10* (2006.01)
*G01S 7/481* (2006.01)
(Continued)

(52) U.S. Cl.
CPC .......... *G02B 26/105* (2013.01); *G01S 7/4811* (2013.01); *G01S 7/4812* (2013.01);
(Continued)

(58) Field of Classification Search
CPC .... G01S 7/4812; G01S 7/4817; G01S 7/4811; G02B 5/04; G02B 26/105; G02B 26/101; G02B 5/22
(Continued)

(56) References Cited

U.S. PATENT DOCUMENTS 3,918,068 A   11/1975   Reinke et al.
4,003,626 A   1/1977    Reinke et al.
(Continued)

FOREIGN PATENT DOCUMENTS

CN        1621322 A      6/2005
CN       101308343 A    11/2008
(Continued)

OTHER PUBLICATIONS

International Application # PCT/US2017/039165 Search Report dated Oct. 4, 2017.
(Continued)

*Primary Examiner* — Daniel L Murphy
(74) *Attorney, Agent, or Firm* — Kligler & Associates

(57) ABSTRACT

Optical scanning apparatus includes a triangular prism, having first and second side faces and a base. A transmitter directs a beam of optical radiation into the prism through the first side face, which refracts the beam so that the optical radiation is incident on and reflects from the base within the prism at a reflection angle that is greater than a total internal reflection (TIR) angle of the prism and exits the prism through the second side face. At least one scanning mirror is positioned to intercept and reflect the beam back into the prism while scanning the beam over an angular range selected such that after refraction of the scanned beam at the second side face, the scanned beam is incident on the base at a transmission angle that is less than the TIR angle and is transmitted out of the prism through the base.

20 Claims, 3 Drawing Sheets

(51) Int. Cl.
  *G02B 5/04* (2006.01)
  *G02B 5/22* (2006.01)
(52) U.S. Cl.
  CPC .............. *G01S 7/4817* (2013.01); *G02B 5/04* (2013.01); *G02B 5/22* (2013.01); *G02B 26/101* (2013.01)
(58) Field of Classification Search
  USPC ........................................................ 356/3.09
  See application file for complete search history.

(56) References Cited

U.S. PATENT DOCUMENTS

| | | | |
|---|---|---|---|
| 5,608,468 | A | 3/1997 | Gove |
| 5,629,790 | A | 5/1997 | Neukermans et al. |
| 5,635,708 | A | 6/1997 | Obata |
| 5,742,419 | A | 4/1998 | Dickensheets et al. |
| 5,847,859 | A | 12/1998 | Murata |
| 5,938,989 | A | 8/1999 | Hambright |
| 6,140,979 | A | 10/2000 | Gerhard et al. |
| 6,517,751 | B1 | 2/2003 | Hambright |
| 6,540,361 | B1 | 4/2003 | Hayashi et al. |
| 6,603,894 | B1 | 8/2003 | Pu |
| 6,753,638 | B2 | 6/2004 | Adams et al. |
| 6,825,967 | B1 | 11/2004 | Chong et al. |
| 6,882,770 | B2 | 4/2005 | Neilson et al. |
| 6,941,034 | B2 | 9/2005 | Kuboi |
| 7,609,875 | B2 | 10/2009 | Liu et al. |
| 7,952,781 | B2 | 5/2011 | Weiss et al. |
| 8,018,579 | B1 | 9/2011 | Krah |
| 8,437,063 | B2 | 5/2013 | Weiss et al. |
| 8,624,177 | B2 | 1/2014 | Campion et al. |
| 8,752,969 | B1 | 6/2014 | Kane et al. |
| 8,797,623 | B2 | 8/2014 | Weiss et al. |
| 9,462,255 | B1 | 10/2016 | Marason et al. |
| 9,703,096 | B2 | 7/2017 | Shpunt et al. |
| 2002/0070335 | A1 | 6/2002 | Orcrutt et al. |
| 2002/0071169 | A1 | 6/2002 | Bowers et al. |
| 2002/0075786 | A1 | 6/2002 | Ikegame et al. |
| 2003/0137711 | A1 | 7/2003 | Yagi et al. |
| 2003/0162313 | A1 | 8/2003 | Kim et al. |
| 2004/0004775 | A1 | 1/2004 | Turner |
| 2004/0021852 | A1 | 2/2004 | Deflumere |
| 2004/0040648 | A1 | 3/2004 | Harden et al. |
| 2004/0063235 | A1 | 4/2004 | Chang |
| 2004/0070816 | A1 | 4/2004 | Kato et al. |
| 2004/0081391 | A1 | 4/2004 | Ko et al. |
| 2004/0105139 | A1 | 6/2004 | Hirose et al. |
| 2004/0207744 | A1 | 10/2004 | Bock |
| 2004/0214350 | A1 | 10/2004 | Pan et al. |
| 2005/0046504 | A1 | 3/2005 | Xiaoyu et al. |
| 2005/0078169 | A1 | 4/2005 | Turner |
| 2007/0064293 | A1 | 3/2007 | Turner et al. |
| 2008/0143196 | A1 | 6/2008 | Sprague et al. |
| 2008/0225368 | A1 | 9/2008 | Ciabattoni et al. |
| 2008/0278785 | A1 | 11/2008 | Klose et al. |
| 2009/0002678 | A1 | 1/2009 | Tanaka et al. |
| 2009/0161177 | A1 | 6/2009 | Nomura |
| 2009/0284817 | A1 | 11/2009 | Orcutt |
| 2009/0294638 | A1 | 12/2009 | Mohanty et al. |
| 2010/0046052 | A1 | 2/2010 | Mizoguchi et al. |
| 2010/0046054 | A1 | 2/2010 | Jeong et al. |
| 2010/0142020 | A1 | 6/2010 | Kim |
| 2010/0182667 | A1 | 7/2010 | Ishida |
| 2010/0253989 | A1 | 10/2010 | Shimizu et al. |
| 2010/0302617 | A1 | 12/2010 | Zhou |
| 2011/0188054 | A1 | 8/2011 | Petronius et al. |
| 2011/0205609 | A1 | 8/2011 | Mizoguchi |
| 2011/0228251 | A1 | 9/2011 | Yee et al. |
| 2011/0228367 | A1 | 9/2011 | Lubianiker et al. |
| 2011/0279648 | A1 | 11/2011 | Lutian et al. |
| 2011/0310125 | A1 | 12/2011 | McEldowney et al. |
| 2012/0236379 | A1 | 9/2012 | Dasilva et al. |
| 2012/0250124 | A1 | 10/2012 | Choi et al. |
| 2012/0307211 | A1 | 12/2012 | Hofmann et al. |
| 2013/0127854 | A1* | 5/2013 | Shpunt ............... G01B 11/2518 345/420 |
| 2013/0206967 | A1 | 8/2013 | Shpunt et al. |
| 2013/0207970 | A1 | 8/2013 | Shpunt et al. |
| 2013/0301101 | A1 | 11/2013 | Conrad et al. |
| 2013/0328140 | A1 | 12/2013 | Potasek et al. |
| 2014/0078514 | A1 | 3/2014 | Zhu |
| 2014/0153001 | A1 | 6/2014 | Chayat et al. |
| 2014/0226145 | A1 | 8/2014 | Steffey et al. |
| 2014/0253994 | A1 | 9/2014 | Benner, Jr. |
| 2014/0291491 | A1 | 10/2014 | Shpunt et al. |
| 2014/0291496 | A1 | 10/2014 | Shpunt et al. |
| 2014/0310914 | A1 | 10/2014 | Erlich et al. |
| 2014/0313519 | A1 | 10/2014 | Shpunt et al. |
| 2015/0234179 | A1 | 8/2015 | Shpunt |
| 2016/0146939 | A1 | 5/2016 | Shpunt et al. |
| 2016/0178895 | A1 | 6/2016 | Gerson et al. |
| 2016/0238834 | A1 | 8/2016 | Erlich et al. |
| 2017/0090186 | A1 | 3/2017 | Gerson et al. |

FOREIGN PATENT DOCUMENTS

| | | |
|---|---|---|
| DE | 102011113147 B3 | 1/2013 |
| EP | 1548487 A1 | 6/2005 |
| EP | 1953583 A2 | 8/2008 |
| EP | 2333603 A1 | 6/2011 |
| EP | 2363686 A1 | 9/2011 |
| GB | 2271436 A | 4/1994 |
| JP | 2004191918 A | 7/2004 |
| JP | 2012242477 A | 12/2012 |
| KR | 100867147 B1 | 11/2008 |
| WO | 2002047241 A1 | 6/2002 |
| WO | 03/049156 A2 | 6/2003 |
| WO | 2005078509 A2 | 8/2005 |
| WO | 2012/020380 A1 | 2/2012 |
| WO | 2012013536 A1 | 2/2012 |
| WO | 2013045699 A1 | 4/2013 |
| WO | 2014016794 A1 | 1/2014 |
| WO | 2014064606 A1 | 5/2014 |

OTHER PUBLICATIONS

Judy et al, "Magnetic Microactuation of Polysilicon Flexure Structures," Solid-State Sensor and Actuator Workshop, 10 pages, year 1994.

Judy et al, "Magnetically Actuated, Addressable Microstructures," Journal of Microelectromechanical Systems, vol. 6, No. 3, pp. 249-256, Sep. 1997.

Cho et al., "A Scanning Micromirror Using a Bi-Directionally Movable Magnetic Microactuator," Proceedings of SPIE, MOEMS and Miniaturized Systems, vol. 4178, pp. 106-115, USA 2000.

Hamamatsu Photonics K.K., "Position sensitive detectors", 7 pages, Japan, Feb. 2010.

Gale, M.T., "Replication Technology for Diffractive Optical Elements", Proceedings of SPIE, vol. 3010, pp. 111-123, May 15, 1997.

Kolste et al., "Injection Molding for Diffractive Optics", Proceedings of SPIE, vol. 2404, pp. 129-131, Feb. 9, 1995.

Gale et al., "Replicated Microstructures for Integrated Topics", Proceedings of SPIE, vol. 2513, pp. 2-10, Aug. 29, 1994.

Jahns et al., "Diffractive Optics and Micro-Optics: Introduction to the Feature Issue", Applied Optics Journal, vol. 36, No. 20, pp. 4633-4634, Jul. 10, 1997.

Nikolejeff et al., "Replication of Continuous Relief Diffractive Optical Elements by Conventional Compact Disc Injection-Molding Techniques", Applied Optics Journal, vol. 36, No. 20, pp. 4655-4659, Jul. 10, 1997.

Neyer et al., "New Fabrication Technology for Polymer Optical Waveguides", Integrated Photonics Research, pp. 248-249, year 1992.

Neyer et al., "Fabrication of Low Loss Polymer Waveguides Using Injection Moulding Technology", Electronics Letters, vol. 29, No. 4, pp. 399-401, Feb. 18, 1993.

Lintec Corporation, "Adwill D-510T Tape", 2 pages, Japan, Apr. 4, 2006.

(56) References Cited

OTHER PUBLICATIONS

Stark, B., "MEMS Reliability Assurance Guidelines for Space Applications", 312 pages, Jet Propulsion Laboratory, California Institute of Technology, Pasadena, USA, Jan. 1999.
Fraunhofer Institute for Photonic Microsystems, "Lamda—Large Aperture MEMS Scanner Module For 3D Distance Measurement"—Data sheet, Dresden, Germany, 2 pages, May 9, 2012.
Yang et al., "Phase synchronization of micro-mirror arrays using elastic linkages", Sensors and Actuators A, Elsevier Sequoia, vol. 95, No. 1, pp. 55-60, Dec. 15, 2001.
Fujita et al., "Dual-Axis MEMS Mirror for Large Deflection-Angle Using SU-8 Soft Torsion Beam," Sensors and Actuators A: Physical, vol. 121, issue 1, pp. 16-21, May 2005.
Stone et al., "Performance Analysis of Next-Generation LADAR for Manufacturing, Construction, and Mobility", National Institute of Standards and Technology, document # NISTIR 7117, 198 pages, Gaithersburg, USA, May 2004.
Sandner et al., "3D imaging using resonant large-aperture MEMS mirror arrays and laser distance measurement", optical MEMs and Nanophotonics, IEEE/LEOS International Conference, pp. 78-79, Aug. 11, 2008.
Hah et al., "Theory and Experiments of Angular Vertical Comb-Drive Actuators for Scanning Micromirrors", IEEE Journal of Selected Topics in Quantum Electronics, vol. 10, No. 3, pp. 505-513, May/Jun. 2004.
Niclass et al., "Design and characterization of a 256x64-pixel single-photon imager in CMOS for a MEMS based laser scanning time-of-flight sensor", Optics Express, vol. 20, No. 11, pp. 11863-11881, May 21, 2012.
Minifaros, "D1.1-ProjectPresentation", V3.0, 36 pages, Dec. 22, 2010.
Sandner et al., "Large Aperture MEMS Segmented Scanner Module for LIDAR Systems", SPAR Conference-Europe, Amsterdam, 48 pages, Dec. 8, 2010.
Shpunt et al., U.S. Appl. No. 14/554,078 filed Nov. 26, 2014.
Shpunt et al., U.S. Appl. No. 14/554,086 filed Nov. 26, 2014.
Gruger et al., "New approach for MEMS scanning mirror for laser projection systems", SPIE Proceedings, vol. 6887, MOEMS and Miniaturized Systems VII, pp. 68870L-68870L, Feb. 8, 2008.
Sandner et al., "Synchronized microscanner array for large aperture receiver optics of LIDAR systems", Proceedings of SPIE—The International Society for Optical Engineering, vol. 7594, 12 pages, Feb. 17, 2010.
U.S. Appl. No. 14/554,078 Office Action dated May 31, 2017.
CN Application # 201580076238.5 office action dated Mar. 19, 2019.
EP Application # 15788293.7 office action dated Feb. 8, 2019.
U.S. Appl. No. 15/622,111 office action dated Feb. 9, 2018.
CN Application # 201580060948.9 office action dated Nov. 28, 2018.
U.S. Appl. No. 15/622,084 office action dated Dec. 11, 2018.
CN Application # 201580005002.2 office action dated Jun. 12, 2018.
U.S. Appl. No. 15/622,111 office action dated Jul. 12, 2018.
U.S. Appl. No. 15/385,883 office action dated Jul. 11, 2018.

\* cited by examiner

10,488,652 B2

PRISM-BASED SCANNER

CROSS-REFERENCE TO RELATED APPLICATION

This application claims the benefit of U.S. Provisional Patent Application 62/397,399, filed Sep. 21, 2016, which is incorporated herein by reference.

FIELD OF THE INVENTION

The present invention relates generally to methods and devices for projection and capture of optical radiation, and particularly to compact optical scanners.

BACKGROUND

Various methods are known in the art for optical 3D mapping, i.e., generating a 3D profile of the surface of an object by processing an optical image of the object. This sort of 3D profile is also referred to as a 3D map, depth map or depth image, and 3D mapping is also referred to as depth mapping.

Some methods of 3D mapping use time-of-flight sensing. For example, U.S. Patent Application Publication 2013/0207970, whose disclosure is incorporated herein by reference, describes a scanning depth engine, which includes a transmitter, which emits a beam comprising pulses of light, and a scanner, which is configured to scan the beam, within a predefined scan range, over a scene. The scanner may comprise a micromirror produced using microelectromechanical system (MEMS) technology. A receiver receives the light reflected from the scene and generates an output indicative of the time of flight of the pulses to and from points in the scene. A processor is coupled to control the scanner and to process the output of the receiver so as to generate a 3D map of the scene.

U.S. Patent Application Publication 2016/0146939, whose disclosure is incorporated herein by reference, describes a scanning device based on a scanner, which includes a base and a gimbal, mounted within the base so as to rotate relative to the base about a first axis of rotation. A transmit mirror and at least one receive mirror are mounted within the gimbal so as to rotate in mutual synchronization about respective second axes, which are parallel to one another and perpendicular to the first axis. A transmitter emits a beam including pulses of light toward the transmit mirror, which reflects the beam so that the scanner scans the beam over a scene. A receiver receives, by reflection from the at least one receive mirror, the light reflected from the scene and generates an output indicative of the time of flight of the pulses to and from points in the scene.

SUMMARY

Embodiments of the present invention that are described hereinbelow provide improved optical scanning devices and methods for production and operation of such devices.

There is therefore provided, in accordance with an embodiment of the invention, optical scanning apparatus, including a triangular prism, having first and second side faces and a base, and a transmitter, which is configured to direct a beam of optical radiation into the prism through the first side face, which refracts the beam so that the optical radiation is incident on and reflects from the base within the prism at a reflection angle that is greater than a total internal reflection (TIR) angle of the prism and exits the prism through the second side face. At least one scanning mirror is positioned to intercept the beam of the optical radiation that has exited the prism through the second side face, and to reflect the beam back into the prism through the second side face while scanning the reflected beam over an angular range selected such that after refraction of the scanned beam at the second side face, the scanned beam is incident on the base at a transmission angle that is less than the TIR angle and is transmitted out of the prism through the base.

In some embodiments, the beam from the transmitter passes through the apparatus along a transmission path and is directed by the at least one scanning mirror toward a scene, and the apparatus includes a receiver, which is configured to receive the optical radiation returned from the scene following transmission of the returned radiation along a return path through the apparatus that is parallel to the transmission path. In a disclosed embodiment, the transmitter is configured to output pulses of radiation, and the receiver is configured to measure respective times of flight of the pulses to and from different points in the scene over which the apparatus scans the beam.

In some embodiments, the first and second side faces are oriented at angles of $\alpha$ and $\alpha'$, respectively, relative to the base, such that $\alpha+\alpha'<90°$.

Additionally or alternatively, the triangular prism is an isosceles prism, such that the first and second side faces have equal lengths and are oriented at equal angles relative to the base. In one embodiment, the first and second side faces are oriented relative to the base at an angle $\alpha$, and the angular range $\Delta\theta_m$ over which the scanning mirror scans the reflected beam is given, in degrees, by $$\Delta\theta_m < \frac{1}{2}[90-\alpha].$$

In some embodiments, the optical radiation is incident on and reflects by TIR from a first area of the base, while the scanned beam is incident on a second area of the base, and wherein the first area is coated with a reflective coating, while the second area is coated with a transmissive coating. In a disclosed embodiment, the transmissive coating includes a bandpass filter having a passband containing an emission wavelength of the transmitter.

There is also provided, in accordance with an embodiment of the invention, optical scanning apparatus, including a triangular prism, having first and second side faces and a base, and a receiver, which is configured to receive incoming optical radiation along a beam axis passing through the prism via the first and second side faces, which refract the beam so that the beam axis impinges on the base within the prism at an angle that is greater than a total internal reflection (TIR) angle of the prism, whereby the incoming optical radiation that enters the prism through the second side face exits the prism through the first side face following TIR from the base. At least one scanning mirror is positioned to intercept the incoming optical radiation following passage of the incoming optical radiation through the base and the second side face while scanning over a range of reception angles that is less than the TIR angle, and to reflect the beam back into the prism through the second side face along the beam axis to the receiver.

In one embodiment, the optical radiation is incident on and reflects by TIR from a first area of the base, while the radiation reflected from the at least one scanning mirror is incident on a second area of the base, and wherein the first area is coated with a reflective coating, while the second area is coated with a transmissive coating.

There is additionally provided, in accordance with an embodiment of the invention, a method for optical scanning, which includes providing a triangular prism, having first and second side faces and a base. A beam of optical radiation is directed into the prism through the first side face, which refracts the beam so that the optical radiation is incident on and reflects from the base within the prism at a reflection angle that is greater than a total internal reflection (TIR) angle of the prism and exits the prism through the second side face. At least one scanning mirror is operated to intercept the beam of the optical radiation that has exited the prism through the second side face, and to reflect the beam back into the prism through the second side face while scanning the reflected beam over an angular range selected such that after refraction of the scanned beam at the second side face, the scanned beam is incident on the base at a transmission angle that is less than the TIR angle and is transmitted out of the prism through the base.

The present invention will be more fully understood from the following detailed description of the embodiments thereof, taken together with the drawings in which:

DETAILED DESCRIPTION OF EMBODIMENTS

The above-mentioned U.S. Patent Application Publication 2016/0146939 describes the use of an interference filter as a cover glass for a low-profile scanner. This approach is effective but still suffers from geometrical constraints and stray light.

In contrast to such an approach, embodiments of the present invention that are described herein use a triangular prism as the cover glass. The prism angles are chosen, along with the positions of the transmitter and/or receiver and scanning mirror, so as to take advantage of total internal reflection (TIR) in order to achieve angular selectivity. Specifically, the beam from the transmitter enters the prism through a first side face, where it is refracted and then strikes the base of the prism at an angle greater than the TIR angle. The beam is thus internally reflected within the prism toward the second side face, where it is refracted out toward the scanning mirror. The beam reflected from the scanning mirror, however, passes back through the prism at an angle below the TIR angle and is thus projected out toward the scene.

Light reflected from the scene can pass back to the receiver in similar fashion. Thus, in various embodiments of the invention, with appropriate configuration and placement of the scanning mirror or mirrors, the prism serves as an output element for a transmitter or as an input element for a receiver or as a combined input/output element for a transmitter/receiver pair.

In some embodiments, areas of the surface of the prism (and particularly certain areas of the base) are coated for enhanced performance. Thus, for example, the area of the base where beams are reflected by TIR may have a reflective coating, while other areas of the base and/or side faces may have anti-reflective coatings and/or bandpass coatings tuned for the wavelength range of the transmitter and/or receiver.

Figure 1:
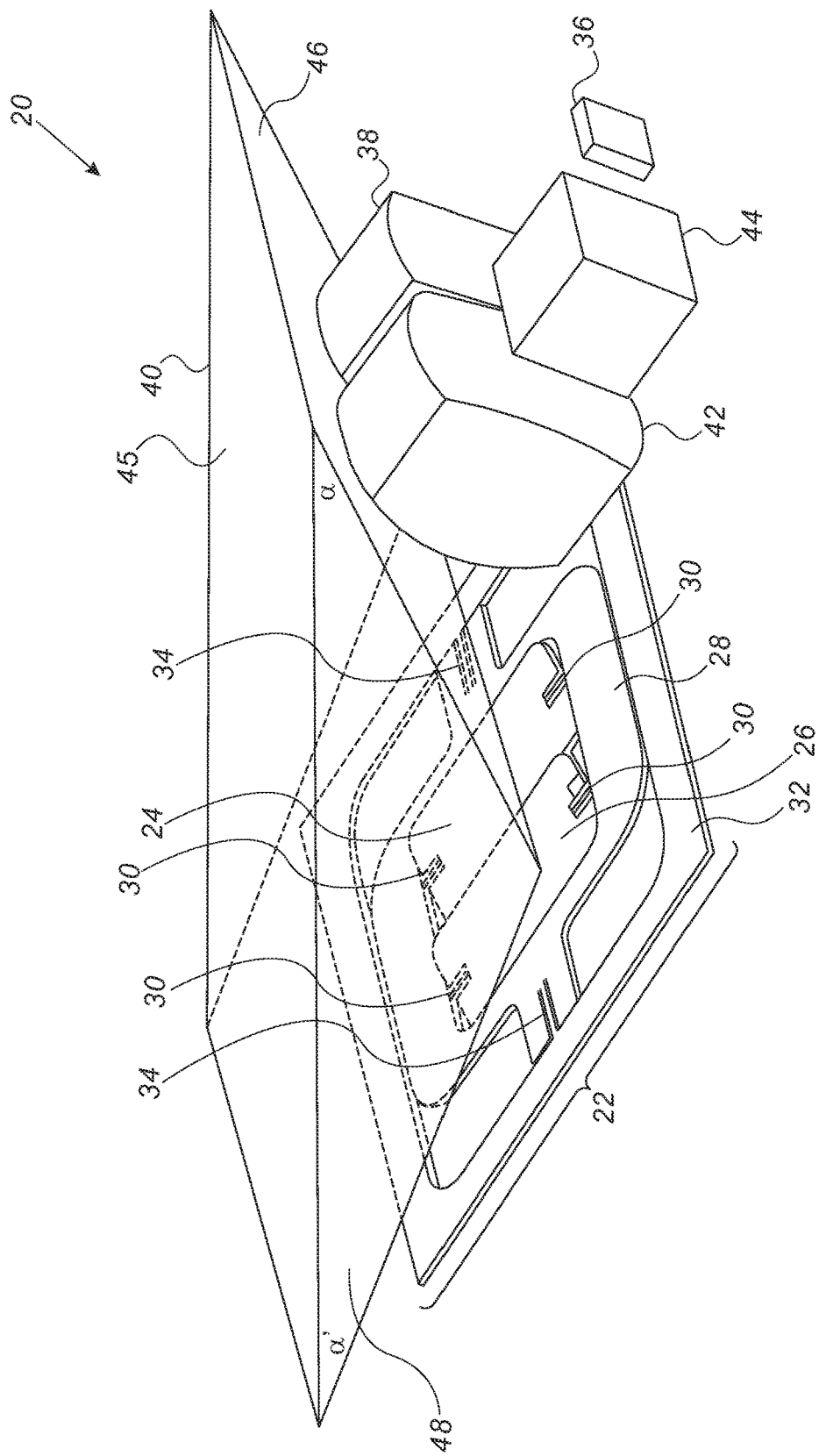
FIG. 1 is a schematic, pictorial illustration of an optical scanning device, in accordance with an embodiment of the invention.

FIG. 1 is a schematic, pictorial illustration of an optical scanning device 20, in accordance with an embodiment of the present invention. Device 20 can be particularly useful as a part of a 3D mapping system or other depth-sensing (LIDAR) device, in conjunction with a suitable processor, scan driver, and mechanical packaging, as are known in the art. (These components are omitted from the figures, however, for the sake of simplicity.) Alternatively, elements of device 20 may be adapted for use as a scanning optical transmitter, receiver, or transceiver in other applications, such as free-space optical communications over a wide-angle optical link.

Scanning device 20 is built around a scanner 22, comprising an adjacent transmit mirror 24 and receive mirror 26, which are mounted together within a gimbal 28. Although only a single receive mirror is shown here, in alternative embodiments (not shown in the figures), two or more receive mirrors may be mounted side-by-side in gimbal 28, parallel to transmit mirror 24. Mirrors 24 and 26 rotate about respective hinges 30 relative to gimbal 28, while gimbal 28 rotates about hinges 34 relative to a base 32. Further details of this sort of scanner are presented in the above-mentioned U.S. Patent Application Publication 2016/0146939. Alternatively, other sorts of scanners, as are known in the art, may be used in device 20, including scanners using a single mirror for both the transmit and receive paths together and scanners in which the transmit and receive paths, as well as the corresponding mirrors, are physically separated from one another.

A transmitter 36 emits pulses of light, which are collimated by a collimating lens 38 and directed by a triangular prism 40 toward transmit mirror 24. (The term "light," in the context of the present description and in the claims, refers to optical radiation of any wavelength, including visible, infrared, and ultraviolet radiation.) Light reflected back from the scene is directed by receive mirror 26 toward prism 40, and from prism 40 to a collection lens 42, which focuses the reflected light onto a receiver 44. Details of the design and operation of prism 40 are presented hereinbelow. In alternative optical layouts (not shown in the figures), light reflected back from the scene may be directed by receive mirror 26 toward a collection lens, without reflection in prism 40.

Receiver 44 typically comprises a high-speed optoelectronic detector. In one embodiment, transmitter 36 comprises a pulsed laser diode, while receiver 44 comprises an avalanche photodiode. The receiver is thus able to measure respective times of flight of the pulses to and from different points in the scene over which device 20 scans the laser beam. Alternatively, any other suitable sorts of emitting and sensing components may be used in device 20.

Figure 2:
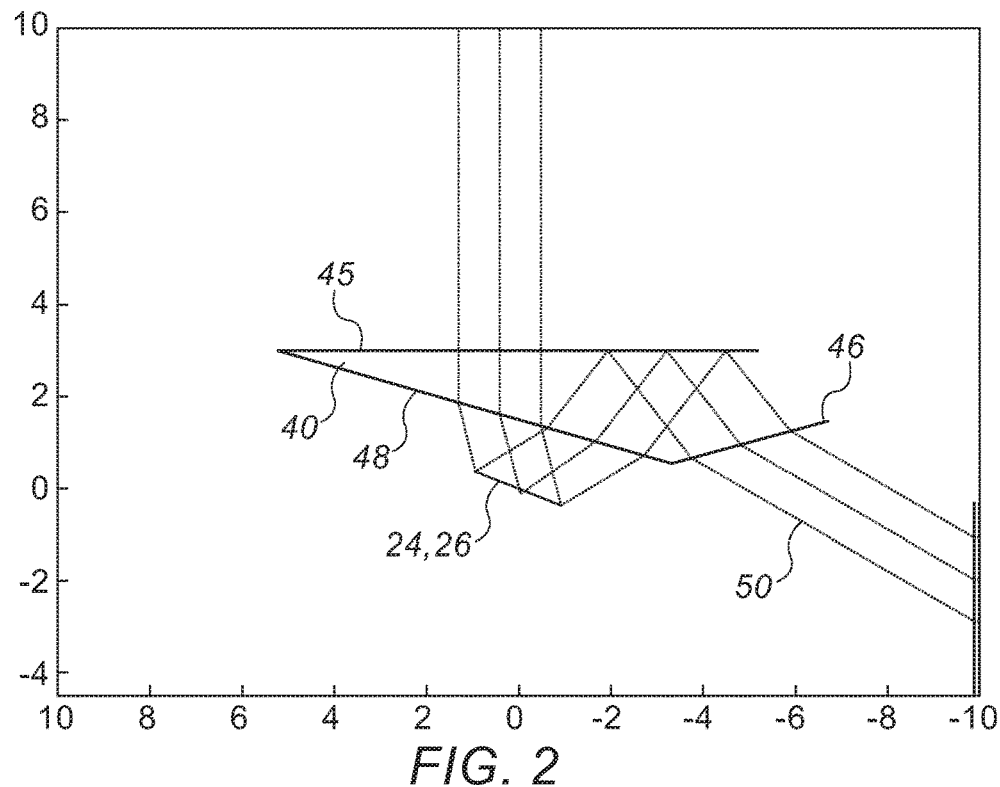
FIGS. 2-4 are schematic ray traces of the optical scanning device of FIG. 1, showing the paths of transmitted and/or received beams in the device in accordance with an embodiment of the invention.
Figure 3:
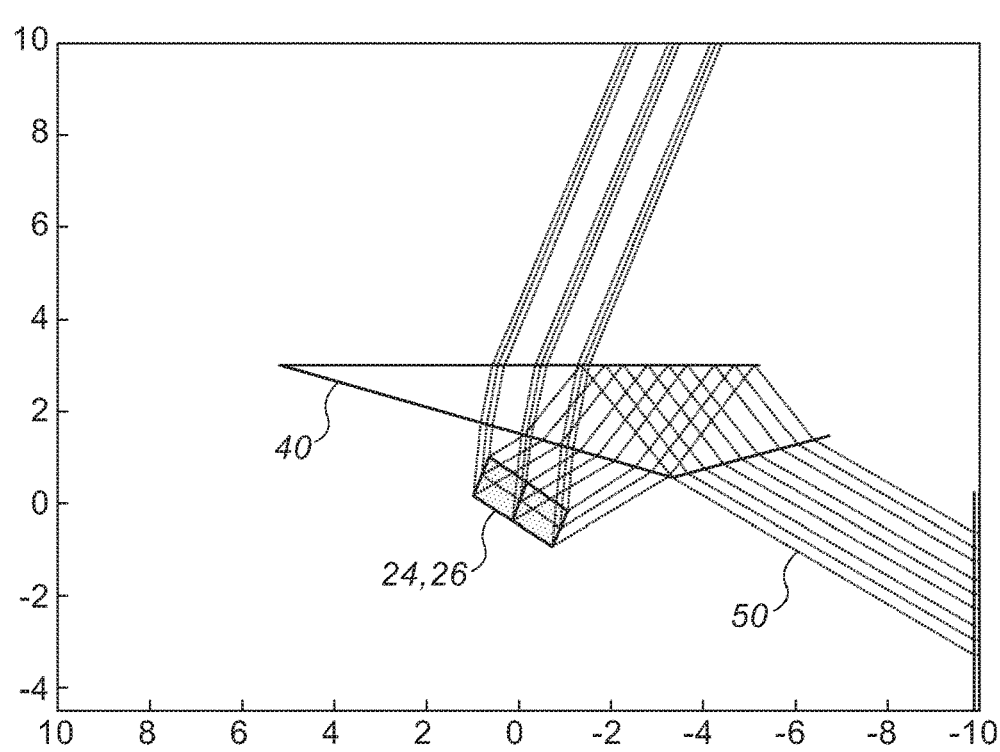
Figure 4:
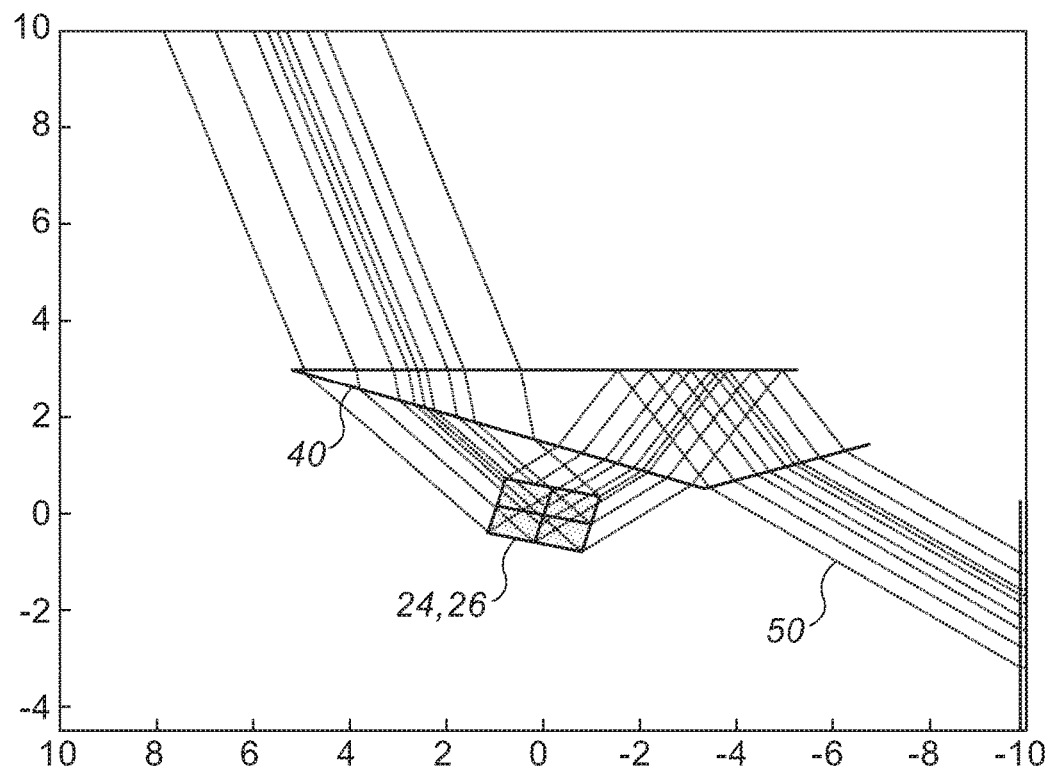

Scanner 22 scans the transmitted and received beams of light together over a predefined angular range, so that at each point in the scan, receiver 44 receives light from the same area of the scene that is illuminated at that point by transmitter 36. (FIGS. 2-4 show the transmitted and received beam angles, by way of example, at three different rotation angles of gimbal 28, and hence of mirrors 24 and 26, within the angular scan range.) Prism 40 is configured and positioned so as to selectively reflect the light emitted by transmitter 36 onto transmit mirror 24 at reflection angles that are outside the angular range of the scan, and similarly to reflect the light reflected from the scene from receive mirror 26 to receiver 44 at such angles. On the other hand, prism 40 selectively transmits light within the predefined angular scan range between mirrors 24, 26 and the scene being scanned (although as noted earlier, in some alternative embodiments, reflector 40 is not present in either the transmit channel or the receive channel).

Triangular prism 40 is specifically designed and configured to achieve this sort of angular selectivity. Prism 40 has a first side face 46 adjacent to transmitter 36 and receiver 44, and a second side face 48 adjacent to scanner 22, along with a base 45 between the side faces. First and second side faces 46 and 48 are oriented at angles of α and α', respectively, relative to base 45, as shown in FIG. 1. To enable reflection of the transmitted beams within prism 40, while maintaining a compact overall structure of device 20 with a low profile in the Z-direction (the direction toward the scene being mapped), it is desirable that α+α'<90°, as in the examples that are shown in the figures.

FIGS. 2-4 are schematic ray traces of device 20, showing the paths of transmitted and/or received beams 50 of optical radiation passing through prism 40, in accordance with an embodiment of the present invention. The figures show the directions of beams 50 for three different angles of mirror 24 and/or mirror 26. Transmitter 36 and/or receiver 44 is assumed to be at the lower right side of these figures, where beams 50 terminate, while the vertical (Z) direction extends toward the scene over which the beams are scanned.

On the transmit path, transmitter 24 directs beam 50 into prism 40 through first side face 46, which refracts the beam so that the optical radiation is incident on and reflects from base 45 within the prism at a reflection angle that is greater than the TIR angle of the prism. The reflected beam then exits the prism through second side face 48. Scanning mirror 24 is positioned to intercept beam 50 that has exited prism 40 through second side face 48, and reflects the beam back into the prism through the second side face at a different angle. Meanwhile, mirror 24 scans the reflected beam over an angular range selected such that after refraction of the scanned beam at second side face 48, the scanned beam is incident on base 45 at a transmission angle that is less than the TIR angle, and thus is transmitted out of the prism through the base toward the scene.

On the return path, receiver 44 receives incoming optical radiation along an axis defined by beams 50. The axis passes through prism 40 via side faces 46 and 48, which refract the beam so that the beam axis impinges on base 45 within the prism at an angle that is greater than the TIR angle of the prism. Thus the incoming optical radiation that enters prism 40 through second side face 48 exits the prism through first side face 46 following TIR from base 45. Mirror 26 is positioned to intercept the incoming optical radiation from scene following passage of the incoming optical radiation through base 45 and second side face 48, in the reverse of the transmit path described above. By scanning over a range of reception angles that is less than the TIR angle, mirror 26 reflects incoming beam 50 back into prism 40 through second side face 48 along the beam axis to receiver 44.

It can be seen in FIGS. 2-4 that beams 50 are incident on and reflect by TIR from a first area of base 45 (the central area in this embodiment), while the scanned beams to and from the scene are incident on and pass through another, second area of the base (at the left side in these figures). It is therefore useful, in some embodiments, to coat the first area with a reflective coating, which will enhance the TIR, while the second area is coated with a transmissive coating. For example, the second area can coated with an anti-reflection coating. Additionally or alternatively, the second area may be coated to define a bandpass filter having a passband containing the emission wavelength of transmitter 36. This bandpass filter is useful, inter alia, in reducing the amount of background radiation reaching receiver 44.

Figure 5:
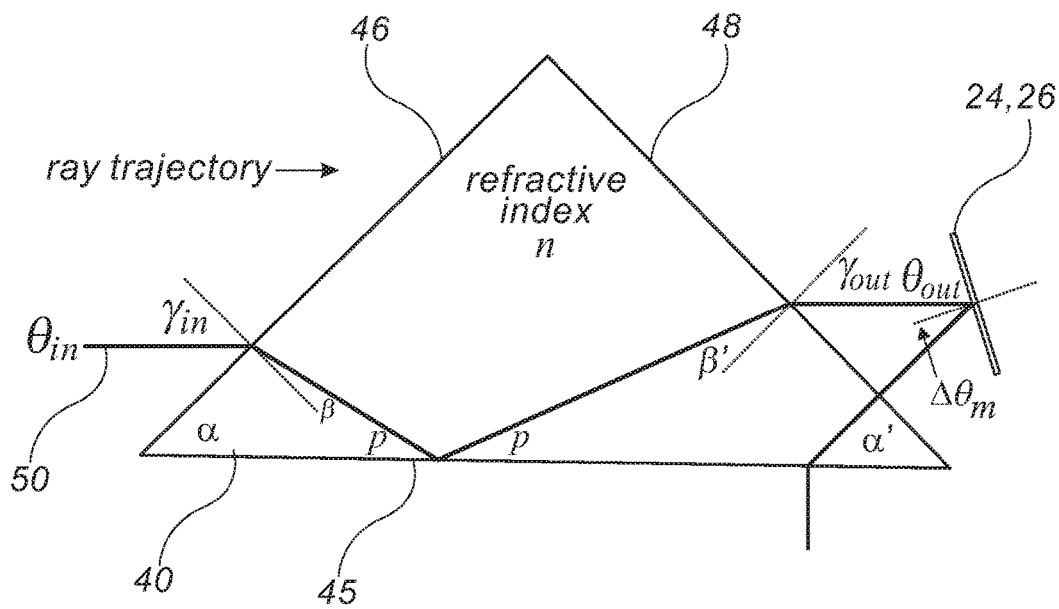
FIG. 5 is a schematic geometrical representation of an optical scanning device, illustrating angular considerations in the design and operation of such a device in accordance with an embodiment of the invention.

FIG. 5 is a schematic geometrical representation of optical scanning device 20, illustrating angular considerations in the design and operation of such a device, and particularly of prism 40, in accordance with an embodiment of the invention. In this example, prism 40 is an isosceles prism, meaning that first and second side faces 46, 48 have equal lengths and are oriented at equal angles α relative to base 45. This arrangement is convenient, in that it results in the beam path through prism 40 being such that the input and output angles $\theta_{in}$ and $\theta_{out}$ of beam 50 are equal, as are the incidence angles $\gamma_{in}$ and $\gamma_{out}$ relative to the normals of faces 46 and 48. (Although $\theta_{in}$ and $\theta_{out}$ are shown in FIG. 5 as being horizontal, the above equalities hold true for angles above and below the horizontal, as well.) Alternatively, the principles of the present invention are also applicable using other triangular prism shapes.

In order for beam 50 to undergo TIR from base 45, given an index of refraction n of prism 40, the input angle to prism 40 is chosen so that the incident angle p on the base satisfies the relation:

$$\sin(90-p) = \cos(p) \geq \frac{1}{n}$$

This TIR condition results in the following relationship between the base angle α and the refracted beam angle β at face 46:

$$\cos(\alpha - \beta) \geq \frac{1}{n}$$

Furthermore, the relation between the base and beam angles at faces 46 and 48 are the same:

$$\cos(\alpha-\beta)=\cos(\alpha'-\beta')$$

The relation between the refracted beam angle and the input angle $\theta_{in}$ at face 46 can be written:

$$\sin(\theta_{in}+\alpha)=n\sin(\beta)$$

A similar relation applies to the angles at face 48. The above equations determine the range of prism base angles and beam input and output angles that can be used for a given index of refraction.

The scanning angles of mirrors 24 and 26 are constrained by the limitation that:

$$\theta_{out}+2\Delta\theta_m+\alpha' \leq 90$$

Assuming α=α' and $\theta_{in}=\theta_{out}=0$, as in the example shown in FIG. 5, the above constraint can be rewritten as:

$$\Delta\theta_m < \frac{1}{2}(90-\alpha)$$

Although the figures described above show a particular optical design and layout of the components of scanning device 20, the principles of the present invention may be applied in scanning devices of other designs. For example, scanner 22 may comprise mirrors and gimbals of different shapes, sizes, orientations and spacing from those shown in the figures, and may further comprise two or more parallel receive mirrors, as noted above. As another example, transmitter 36 or receiver 44 may be positioned to transmit and receive light to and from scanner 22 directly, without intervening prism 40. Alternative designs based on the principles set forth above will be apparent to those skilled in the art and are also considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical scanning apparatus, comprising:
   a triangular prism, having first and second side faces and a base;
   a transmitter, which is configured to direct a beam of optical radiation into the prism through the first side face, which refracts the beam so that the optical radiation is incident on and reflects from the base within the prism at a reflection angle that is greater than a total internal reflection (TIR) angle of the prism and exits the prism through the second side face; and
   at least one scanning mirror, which is positioned to intercept the beam of the optical radiation that has exited the prism through the second side face, and to reflect the beam back into the prism through the second side face while scanning the reflected beam over an angular range selected such that after refraction of the scanned beam at the second side face, the scanned beam is incident on the base at a transmission angle that is less than the TIR angle and is transmitted out of the prism through the base.

2. The apparatus according to claim 1, wherein the beam from the transmitter passes through the apparatus along a transmission path and is directed by the at least one scanning mirror toward a scene, and wherein the apparatus comprises a receiver, which is configured to receive the optical radiation returned from the scene following transmission of the returned radiation along a return path through the apparatus that is parallel to the transmission path.

3. The apparatus according to claim 2, wherein the transmitter is configured to output pulses of radiation, and wherein the receiver is configured to measure respective times of flight of the pulses to and from different points in the scene over which the apparatus scans the beam.

4. The apparatus according to claim 1, wherein the first and second side faces are oriented at angles of $\alpha$ and $\alpha'$, respectively, relative to the base, such that $\alpha+\alpha'<90°$.

5. The apparatus according to claim 1, wherein the triangular prism is an isosceles prism, such that the first and second side faces have equal lengths and are oriented at equal angles relative to the base.

6. The apparatus according to claim 5, wherein the first and second side faces are oriented relative to the base at an angle $\alpha$, and wherein the angular range $\Delta\theta_m$ over which the scanning mirror scans the reflected beam is given, in degrees, by $$\Delta\theta_m < \frac{1}{2}[90-\alpha].$$

7. The apparatus according to claim 1, wherein the optical radiation is incident on and reflects by TIR from a first area of the base, while the scanned beam is incident on a second area of the base, and wherein the first area is coated with a reflective coating, while the second area is coated with a transmissive coating.

8. The apparatus according to claim 7, wherein the transmissive coating comprises a bandpass filter having a passband containing an emission wavelength of the transmitter.

9. Optical scanning apparatus, comprising:
   a triangular prism, having first and second side faces and a base;
   a receiver, which is configured to receive incoming optical radiation along a beam axis passing through the prism via the first and second side faces, which refract the beam so that the beam axis impinges on the base within the prism at an angle that is greater than a total internal reflection (TIR) angle of the prism, whereby the incoming optical radiation that enters the prism through the second side face exits the prism through the first side face following TIR from the base; and
   at least one scanning mirror, which is positioned to intercept the incoming optical radiation following passage of the incoming optical radiation through the base and the second side face while scanning over a range of reception angles that is less than the TIR angle, and to reflect the beam back into the prism through the second side face along the beam axis to the receiver.

10. The apparatus according to claim 9, wherein the first and second side faces are oriented at angles of $\alpha$ and $\alpha'$, respectively, relative to the base, such that $\alpha+\alpha'<90°$.

11. The apparatus according to claim 9, wherein the triangular prism is an isosceles prism, such that the first and second side faces have equal lengths and are oriented at equal angles relative to the base.

12. The apparatus according to claim 11, wherein the first and second side faces are oriented relative to the base at an angle $\alpha$, and wherein the angular range $\Delta\theta_m$ over which the scanning mirror scans the reflected beam is given, in degrees, by $$\Delta\theta_m < \frac{1}{2}[90-\alpha].$$

13. The apparatus according to claim 9, wherein the optical radiation is incident on and reflects by TIR from a first area of the base, while the radiation reflected from the at least one scanning mirror is incident on a second area of the base, and wherein the first area is coated with a reflective coating, while the second area is coated with a transmissive coating.

14. The apparatus according to claim 13, wherein the transmissive coating comprises a bandpass filter having a passband containing a reception wavelength of the receiver.

15. A method for optical scanning, comprising:
   providing a triangular prism, having first and second side faces and a base;
   directing a beam of optical radiation into the prism through the first side face, which refracts the beam so that the optical radiation is incident on and reflects from the base within the prism at a reflection angle that is greater than a total internal reflection (TIR) angle of the prism and exits the prism through the second side face; and operating at least one scanning mirror to intercept the beam of the optical radiation that has exited the prism through the second side face, and to reflect the beam back into the prism through the second side face while scanning the reflected beam over an angular range selected such that after refraction of the scanned beam at the second side face, the scanned beam is incident on the base at a transmission angle that is less than the TIR angle and is transmitted out of the prism through the base.

16. The method according to claim 15, wherein the beam is directed through the triangular prism along a transmission path and is directed by the at least one scanning mirror toward a scene, and wherein the method comprises receiving the optical radiation returned from the scene following transmission of the returned radiation along a return path through the triangular prism that is parallel to the transmission path.

17. The method according to claim 16, wherein directing the beam comprises transmitting pulses of the optical radiation, and wherein receiving the optical radiation comprises measuring respective times of flight of the pulses to and from different points in the scene over which the at least one scanning mirror scans the beam.

18. The method according to claim 15, wherein the first and second side faces are oriented at angles of $\alpha$ and $\alpha'$, respectively, relative to the base, such that $\alpha+\alpha'<90°$.

19. The method according to claim 15, wherein the triangular prism is an isosceles prism, such that the first and second side faces have equal lengths and are oriented at equal angles relative to the base.

20. The method according to claim 15, wherein the optical radiation is incident on and reflects by TIR from a first area of the base, while the scanned beam is incident on a second area of the base, and wherein the first area is coated with a reflective coating, while the second area is coated with a transmissive coating.

* * * * *